(12) United States Patent
Kawai et al.

(10) Patent No.: US 8,322,985 B2
(45) Date of Patent: Dec. 4, 2012

(54) WIND TURBINE GENERATOR

(75) Inventors: Masahiro Kawai, Nagasaki (JP);
Takatoshi Matsushita, Nagasaki (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 111 days.

(21) Appl. No.: 12/515,772

(22) PCT Filed: Aug. 14, 2008

(86) PCT No.: PCT/JP2008/064581
§ 371 (c)(1),
(2), (4) Date: Jun. 23, 2009

(87) PCT Pub. No.: WO2009/066491
PCT Pub. Date: May 28, 2009

(65) Prior Publication Data
US 2011/0012362 A1    Jan. 20, 2011

(30) Foreign Application Priority Data
Nov. 22, 2007 (JP) ................................. 2007-302626

(51) Int. Cl.
*F03D 1/00* (2006.01)
(52) U.S. Cl. ...................................... 416/93 R; 415/175
(58) Field of Classification Search ................. 416/93 R, 416/244 R; 415/175, 176, 177, 180; 290/44, 290/55
See application file for complete search history.

(56) References Cited

U.S. PATENT DOCUMENTS

| | | | | |
|---|---|---|---|---|
| 4,749,335 A * | 6/1988 | Brandt et al. | ............. | 416/157 R |
| 6,278,197 B1 * | 8/2001 | Appa | ............... | 290/55 |
| 6,492,743 B1 * | 12/2002 | Appa | ............... | 290/55 |
| 6,676,122 B1 * | 1/2004 | Wobben | ............... | 290/55 |
| 7,637,715 B2 * | 12/2009 | Battisti | ............... | 415/115 |
| 2004/0041408 A1* | 3/2004 | Casazza | ............... | 290/55 |
| 2007/0116567 A1 | 5/2007 | Luetze | | |

FOREIGN PATENT DOCUMENTS

| | | | |
|---|---|---|---|
| DE | 842330 | * | 6/1952 |
| DE | 19802574 | * | 3/1999 |
| JP | 58-065977 A | | 4/1983 |
| JP | 06-033868 A | | 2/1994 |
| JP | 06-064895 A | | 3/1994 |
| JP | 2002-013467 A | | 1/2002 |

(Continued)

OTHER PUBLICATIONS

Gawlik et al., Wind Power Generator Plant, Mar. 1999, Abstract of DE 19802574.*

(Continued)

*Primary Examiner* — Edward Look
*Assistant Examiner* — Liam McDowell
(74) *Attorney, Agent, or Firm* — Kanesaka, Berner & Partners

(57) ABSTRACT

A wind turbine generator in which the temperature in a rotor head can be managed is provided. The wind turbine generator 1 includes, in a nacelle 3, a driving and generating mechanism that is connected to a rotor head 4 equipped with wind turbine blades 5, and devices are disposed inside the rotor head 4, wherein a rotary joint 30 is interposed on a driving shaft that joins the rotor head 4 and the nacelle 3, and fluid for regulating the temperature in the rotor head is supplied from the interior of the nacelle 3 into the rotor head 4 through the rotary joint 30.

3 Claims, 5 Drawing Sheets

FOREIGN PATENT DOCUMENTS

| | | | |
|---|---|---|---|
| JP | 2003-343417 | A | 12/2003 |
| JP | 2004-025676 | A | 1/2004 |
| JP | 2004-293527 | A | 10/2004 |
| JP | 2005-36727 | * | 2/2005 |
| JP | 2005069082 | * | 3/2005 |
| JP | 2007-231778 | A | 9/2007 |
| TW | M242587 | U | 9/2004 |
| TW | M255332 | U | 1/2005 |

OTHER PUBLICATIONS

Saito et al., Anemometer and Wind Power Generation Device, Feb. 10, 2005, Abstract of JP2005-36727.*

Taiwan Office Action for TW 097132550, dated Jun. 24, 2011.

* cited by examiner

WIND TURBINE GENERATOR

CROSS-REFERENCE TO RELATED APPLICATIONS

The present Application is based on International Application No. PCT/JP2008/064581, filed on Aug. 14, 2008, which in turn corresponds to Japanese Application No. 2007-302626 filed on Nov. 22, 2007, and priority is hereby claimed under 35 USC §119 based on these applications. Each of these applications are hereby incorporated by reference in their entirety into the present application.

TECHNICAL FIELD

Background Art

A known wind turbine generator in the related art generates electricity using wind power, which is natural energy. This type of wind turbine generator is configured such that a nacelle mounted on a tower is provided with a rotor head equipped with wind turbine blades, a main shaft connected to the rotor head so as to rotate together therewith, a gear box connected to the main shaft that rotates by receiving wind power with the wind turbine blades, and a generator driven by the shaft output power of the gear box. In the thus-configured wind turbine generator, the rotor head having the wind turbine blades that convert wind power to rotational power and the main shaft rotate to generate shaft output power, and the shaft output power, which is increased in rotational speed through the gear box connected to the main shaft, is transmitted to the generator. Thus, power generation can be performed using the shaft output power obtained by converting wind power to rotational power as a driving source for the generator, that is, using wind power as motive power for the generator.

In the conventional wind turbine generator described above, devices that involve heat generation, such as a pitch control unit, are accommodated in a rotating-side rotor head. In particular, with the increasing size of wind turbine blades recently, besides the increasing number of devices that generate a large amount of heat, there is also an increasing trend in the number of control devices that require temperature management of their installation environments, for example, the use of pitch control mechanisms that change the blade pitch quickly and accurately in response to fluctuations in wind speed.

Also the nacelle accommodates devices that generate heat during operation, for example, the gear box and generator. Therefore, a cooling structure in which an air intake port and an air exhaust port are formed is employed, and the interior of the nacelle is ventilated with a fan driven by a wind turbine to thereby prevent an increase in temperature therein. (For example, refer to Patent Document 1)

For wind turbine generators, a cooling mechanism has been proposed that releases heat generated by a generator into the wind that has rotated the rotor with a plurality of fins provided on a frame that partitions the outer circumferential surface of the generator and outside air. This cooling mechanism does not need an intake port, an exhaust port, or a cooling fan. (For example, refer to Patent Document 2)

Patent Document 1: Japanese Unexamined Patent Application, Publication No. Sho 58-65977

Patent Document 2: Japanese Unexamined Patent Application, Publication No. 2002-13467

DISCLOSURE OF INVENTION

As described above, in recent wind turbine generators, wind turbine blades are becoming larger to obtain high output power. Therefore, the motive power of a hydraulic mechanism etc. necessary for, for example, a device that controls the pitch of the wind turbine blades also increases, thus increasing the amount of heat generated therein. Accordingly, the temperature in the rotor head tends to rise as the wind turbine blades become large.

Since the interior of the rotor head, which is a rotating body, has a gap between it and the nacelle, which is a non-rotating body, there is a problem of intrusion of rain through the gap. Furthermore, if liquid in the hydraulic mechanism, such as working oil or lubricating oil, leaks in the rotary head, there is also a risk of the leaked liquid being splashed around the wind turbine generator due to the rotation of the rotor head. Therefore, the rotor head needs to adopt a sealing structure, which significantly increases the internal temperature due to an increase in the amount of heat generated in the internal devices.

However, the rotor head also accommodates control devices etc. that are under severe installation temperature conditions. Therefore, sufficient temperature management is required, such as cooling the interior of the rotor head, to operate them normally.

In the case where the installation environment of the wind turbine generator is a cold region, the internal temperature of the rotor head needs to satisfy the above-described low-temperature condition required for the control devices etc. Furthermore, also for the liquid, such as hydraulic working oil and lubricating oil, changes in the properties due to the low temperature become a problem, which requires temperature management, such as heating the interior of the rotor head.

Against such a backdrop, as wind turbine generators become larger, it becomes an important issue to manage the temperature of the interior of the rotor head by cooling or heating, thereby improving the reliability and durability of the wind turbine generators.

The present invention is made in consideration of the above-described circumstances, and it is an object of thereof to provide a wind turbine generator that is capable of temperature management of the interior of the rotor head.

The present invention adopts the following solutions to solve the above problems.

A wind turbine generator of the present invention is a wind turbine generator in which a driving and generating mechanism that is connected to a rotor head equipped with wind turbine blades is accommodated in a nacelle, and devices are disposed inside the rotor head, wherein a rotary joint is interposed in a driving shaft system that joins the rotor head and the nacelle, and fluid for regulating the temperature in the rotor head is supplied from the interior of the nacelle into the rotor head through the rotary joint.

With such a wind turbine generator, a rotary joint is interposed at an appropriate position of a driving shaft system that joins the rotor head and the nacelle, and fluid for regulating the temperature in the rotor head can be supplied from the interior of the non-rotating-side nacelle into the rotating-side rotor head through the rotary joint. Therefore, the internal temperature can be managed by cooling or heating as necessary.

With the present invention described above, a rotary joint is interposed at an appropriate position of a driving shaft system that joins the rotor head and the nacelle, so that fluid for regulating the temperature in the rotor head can be supplied from the interior of the non-rotating-side nacelle into the rotating-side rotor head through the rotary joint. Therefore, the internal temperature of the rotor head can be managed by cooling or heating the interior as necessary. This allows control devices etc. mounted in the rotor head to be operated within a predetermined temperature range and can prevent changes in the properties of hydraulic working oil, lubricating oil, etc. at a low temperature, thus offering notable advantages in improving the reliability and durability of the wind turbine generator.

EXPLANATION OF REFERENCE SIGNS

Figure 1:
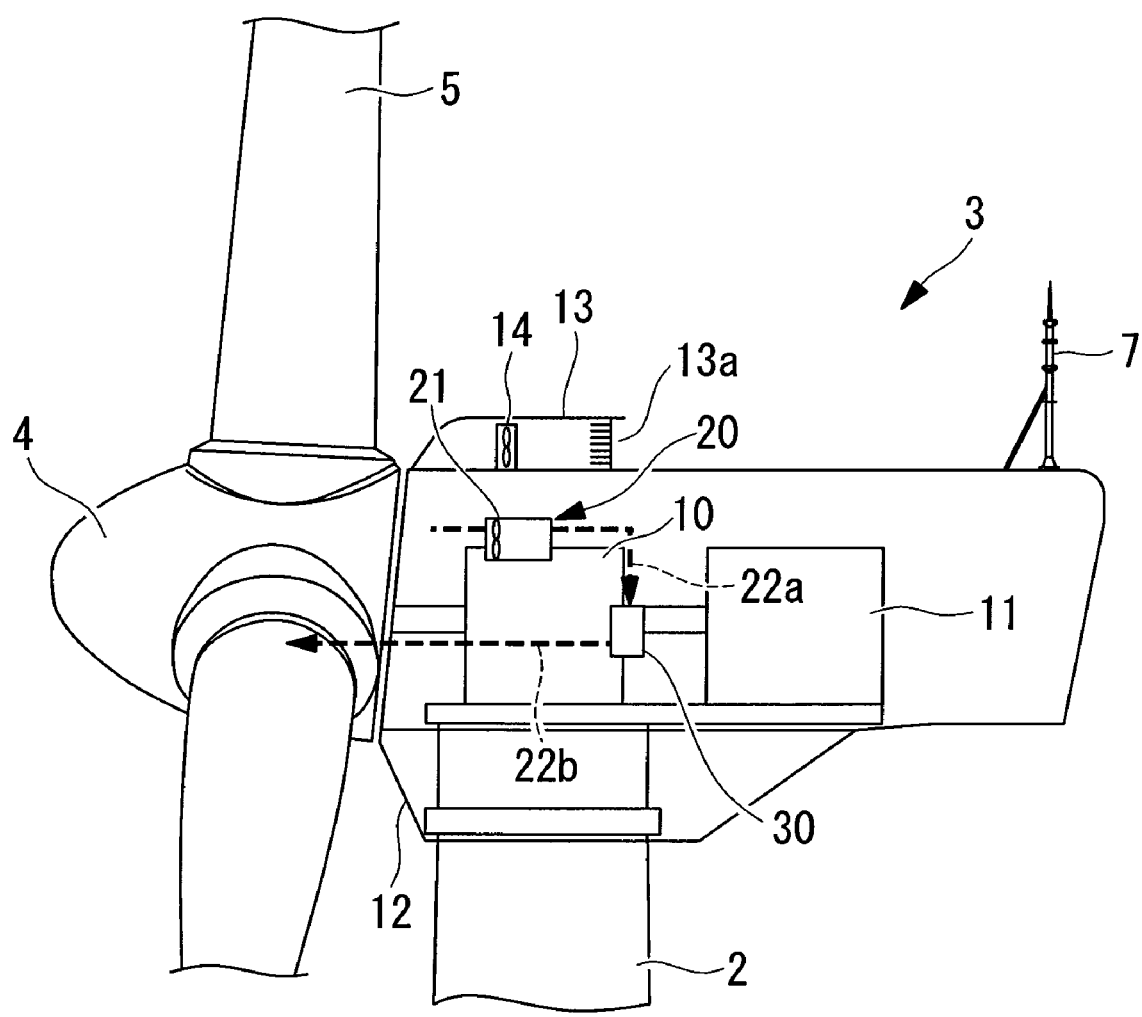
FIG. 1 is a sectional view of relevant parts showing an embodiment of a wind turbine generator according to the present invention.

1: wind turbine generator
2: tower
3: nacelle
4: rotor head
5: wind turbine blade
7: anemoscope/anemometer
10: gear box
11: generator
20: blowing unit
30: rotary joint

BEST MODE FOR CARRYING OUT THE INVENTION

An embodiment of a wind turbine generator according to the present invention will be described hereinbelow with reference to the drawings.

Figure 5:
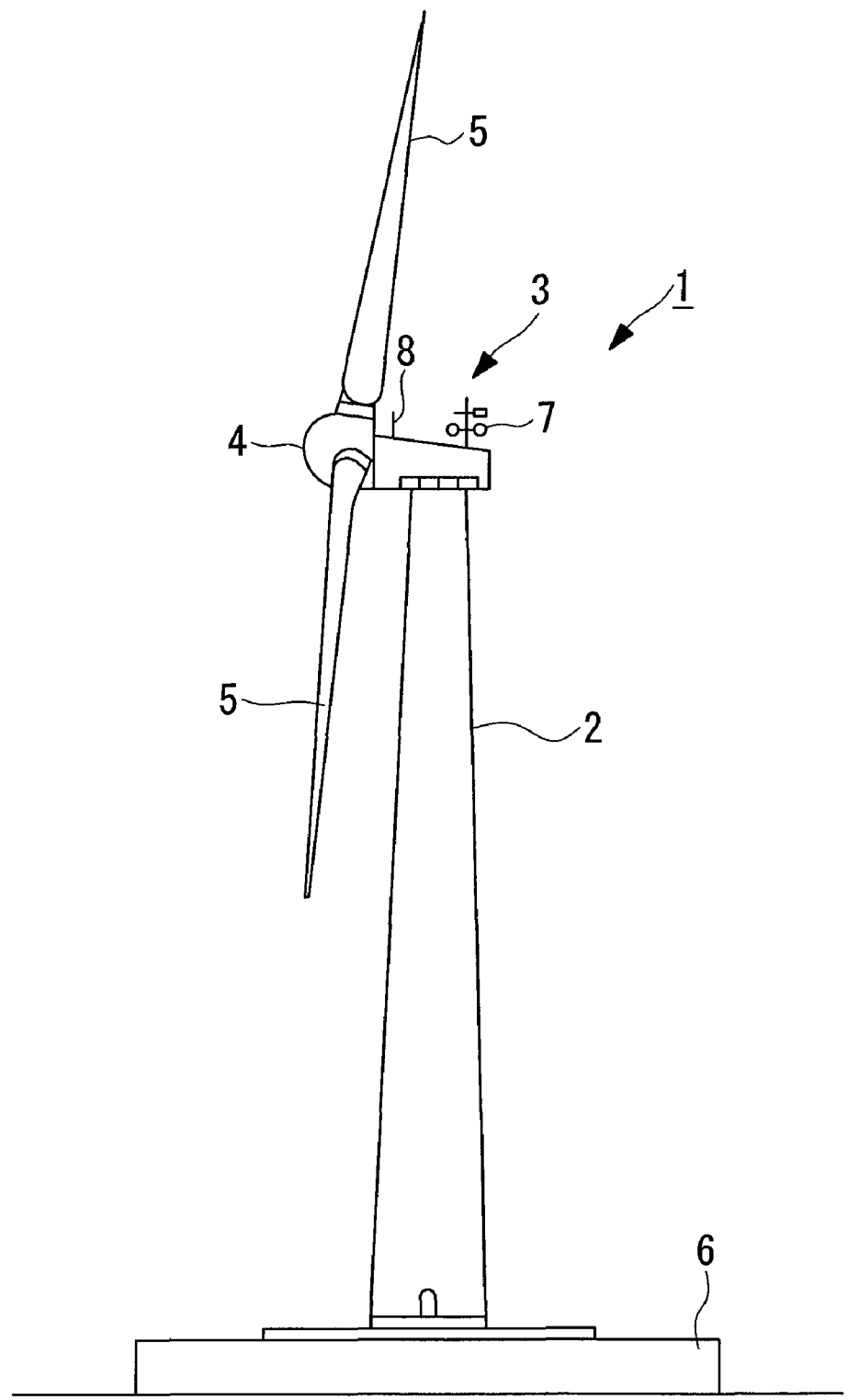
FIG. 5 is a diagram showing an example of the overall configuration of the wind turbine generator.

As shown in FIG. 5, a wind turbine generator 1 includes a tower 2 that is vertically erected on a base 6, a nacelle 3 mounted on the upper end of the tower 2, and a rotor head 4 mounted on the nacelle 3 so as to be rotatable about the substantially horizontal axis thereof.

The rotor head 4 has a plurality of wind turbine blades 5 mounted radially about its rotation axis. As a result, the force of wind blowing against the wind turbine blades 5 from the direction of the rotation axis of the rotor head 4 is converted to motive power that rotates the rotor head 4 about the rotation axis.

An anemoscope/anemometer 7 that measures the wind velocity value in the vicinity and a lightning rod 8 are provided at appropriate positions (for example, at the top etc.) of the outer peripheral surface of the nacelle 3.

As shown in FIG. 1, for example, the nacelle 3 accommodates a driving and generating mechanism equipped with a generator 11 that is connected to the rotor head 4 via a gear box 10 coaxial therewith. That is, generator output power W is obtained from the generator 11 by driving the generator 11 while increasing the rotational speed of the rotor head 4 with the gear box 10.

The above-described nacelle 3 has intake and exhaust ports for cooling the interior by ventilation. In the illustrated configuration example, an intake port 12 opens at the lower front end of the nacelle 3, and an exhaust port 13a opens at the end of an exhaust duct 13 formed on the upper surface of the nacelle 3.

A cooling fan 14 for ventilating and cooling the interior of the nacelle 3 is provided at an appropriate position in the nacelle 3, for example, in the exhaust duct 13, that is, in the vicinity of the exhaust port 13a. By operating the cooling fan 14, outside air is introduced into the nacelle 3 through the air intake port 12, and the outside air passes through necessary portions in the nacelle 3 to ventilate and cool the interior, thereafter passes through the cooling fan 14, and flows out through the exhaust port 13a.

The above-described nacelle 3 accommodates a blowing unit 20 that regulates the internal temperature of the rotor head 4. The blowing unit 20 blows the air in the nacelle 3 by the operation of an internal fan 21 to regulate (cool or heat) the air temperature in the rotor head 4.

The blowing unit 20 used here may be a single internal fan 21 as a blower capable of blowing the air in the nacelle 3, or alternatively, may be a combination with a heat pump or a heater used in, for example, an air conditioner, so that it can blow the air while actively regulating the air temperature in the nacelle 3. That is, in the case of the blowing unit 20 in combination with a heat pump, although not shown, it is equipped with a compressor that sends refrigerant under pressure, a four-way valve that selects and switches the circulating direction of the refrigerant, a pair of heat exchangers that functions as a condenser or an evaporator in accordance with the circulating direction of the refrigerant, and a throttling mechanism including a capillary tube and an expansion valve.

In the description below, the whole operation for regulating the temperature of the air in the nacelle 3 by cooling or heating is generically referred to as "temperature regulation" when the distinction between cooling and heating is unnecessary.

The air (temperature-regulating fluid) in the nacelle 3 is supplied to the interior of the rotor head 4 through a temperature regulation pipe 22a, a rotary joint 30, and a temperature regulation pipe 22b by driving of the internal fan 21 in the blowing unit 20.

The fluid is fed from the interior of the nacelle 3 into the rotor head 4 through a rotary joint 30 interposed, for example, in the drive shaft section connecting the gear box 10 and the generator 11, of the drive shaft system that joins the rotor head 4 and the nacelle 3. That is, the temperature regulation pipes 22a and 22b through which the temperature-regulating air passes are connected from the fixed-side nacelle 3 to the rotating-side rotor head 4 via the rotary joint 30 interposed at an appropriate position of the driving shaft system that joins the rotor head 4 and the nacelle 3.

Figure 2A:
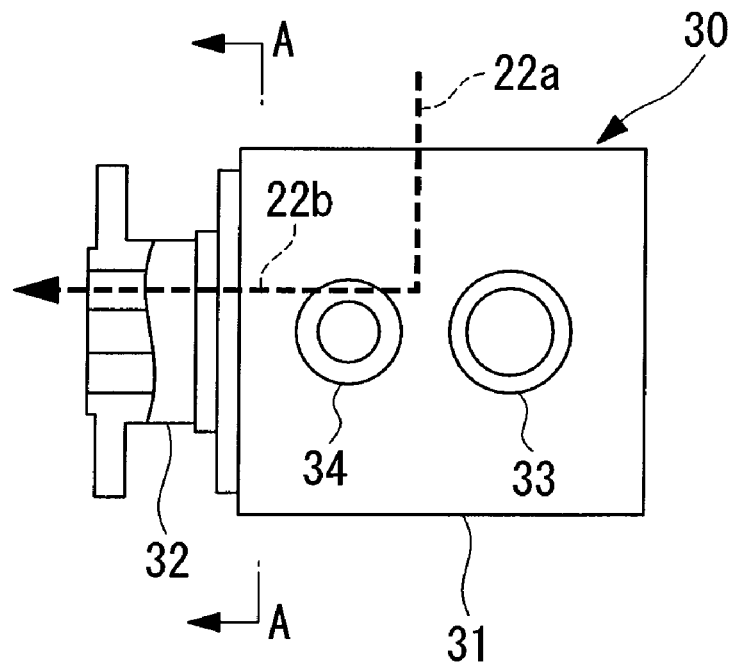
FIG. 2A is a partial sectional plan view of a rotary joint shown in FIG. 1 as a configuration example.
Figure 2B:
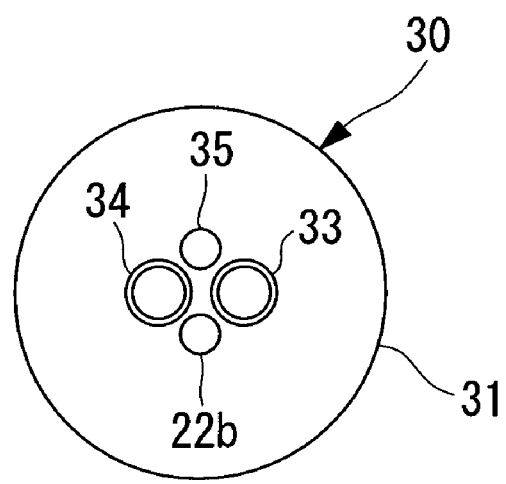
FIG. 2B is a cross-sectional view of FIG. 2A taken along line A-A.

The above-described rotary joint 30 is a joint that joins a fixed-side member and a rotating-side member to allow supply of fluid. As shown in FIGS. 2A and 2B, for example, it includes a fixed-side main body 31 fixed to and supported by the nacelle 3 side and a rotating-side main body 32 joined to the rotor head 4 side, and fluid etc. that flows in pipes, such as the temperature regulation pipe 22a, joined to the fixed-side main body 31 is supplied to the non-rotating temperature regulation pipe 22b etc. passing through the rotating-side main body 32, inside the rotary joint 30. A hydraulic-oil feed pipe 33 that feeds the rotor head 4 with hydraulic working oil for controlling the pitch, a hydraulic-oil return pipe 34 that returns the hydraulic working oil to the nacelle 3 side, a wiring conduit tube 35 through which wires and cables for power supply and control necessary for various controls of the devices mounted in the rotor head 4 pass, and the temperature regulation pipe 22b that supplies the temperature-regulating air to the rotor head 4 pass through the rotary joint 30 shown in FIG. 2B.

Figure 3:
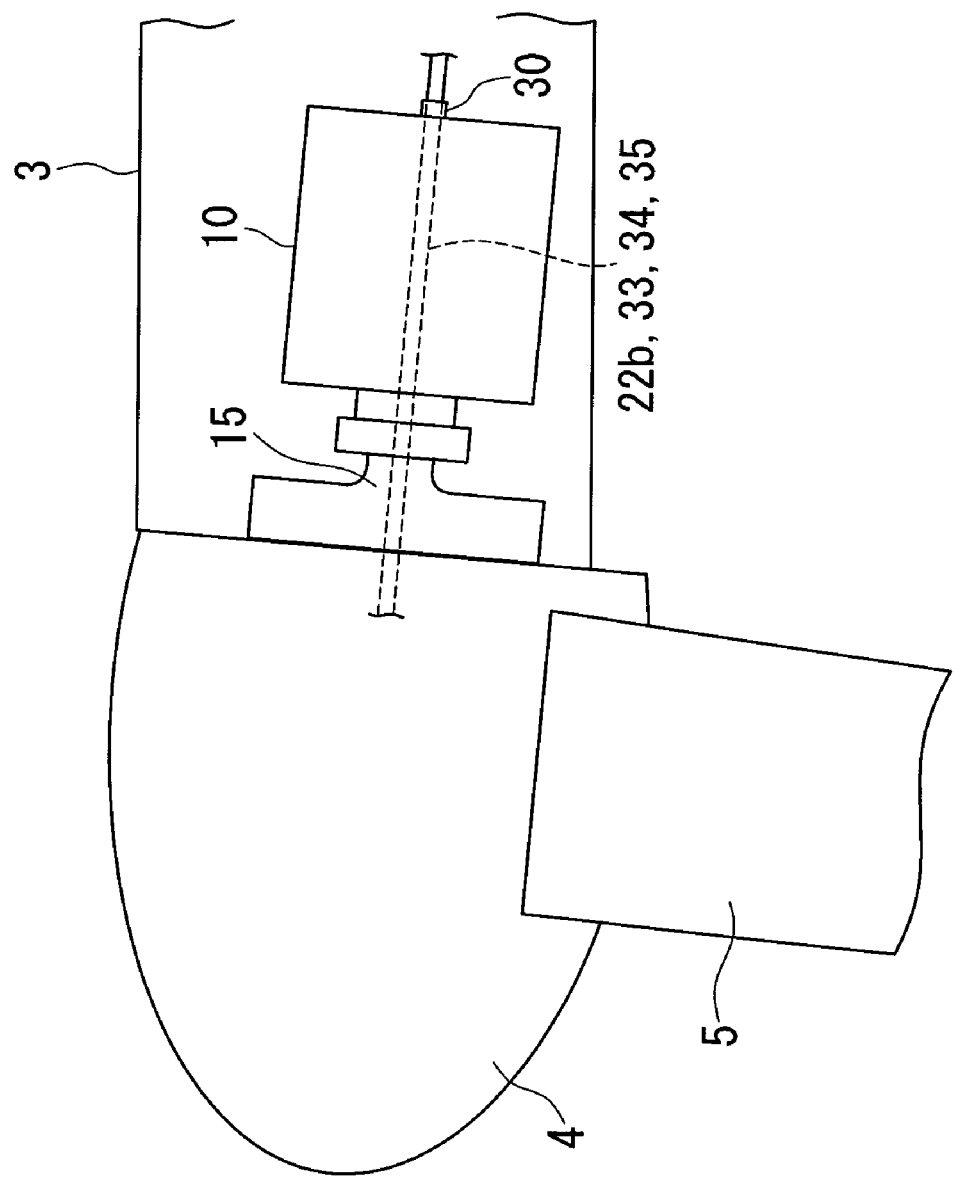
FIG. 3 is a diagram showing the connecting structure of a rotor head and a nacelle.

FIG. 3 shows the connecting structure of the rotor head 4 and the nacelle 3, in which reference numeral 15 denotes the main shaft that transmits the rotation of the rotor head 4 to the gear box 10.

In the wind turbine generator 1 with the above-described configuration, temperature control of the interior of the rotary head 4 is performed as described below. This temperature control is part of the operational control executed by, for example, a nacelle control unit (not shown) mounted in the nacelle 3.

Figure 4:
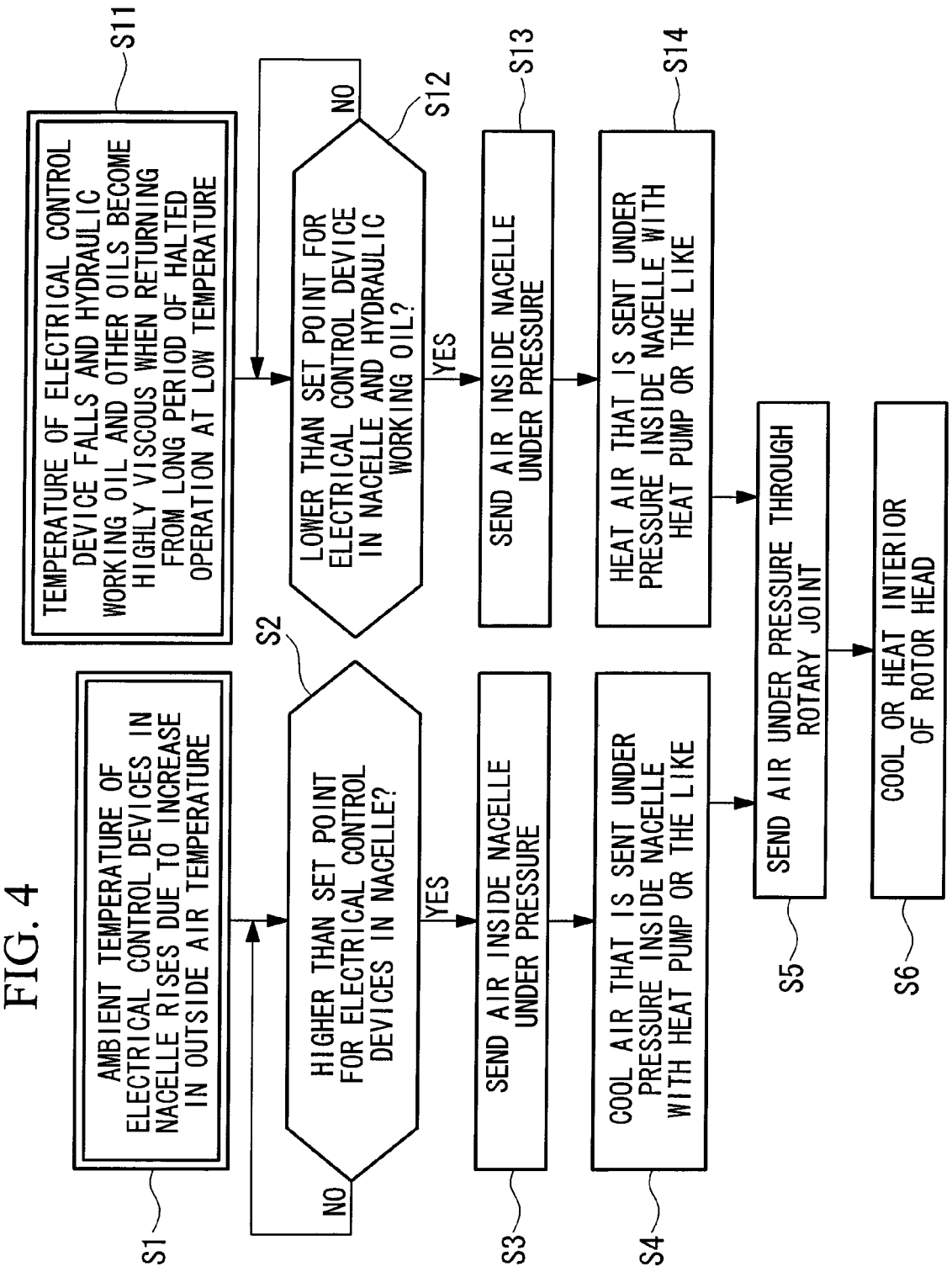
FIG. 4 is a flowchart showing an example of cooling/heating control of the interior of the rotary head by a control unit.

The flowchart shown in FIG. 4 shows an example of the temperature control of the blowing unit 20 equipped with a heat pump to cool/heat the temperature-regulating air. In the first step S1, if the ambient temperature of the electrical control devices mounted in the nacelle 3 rises due to an increase in outside air temperature, the process proceeds to the next step S2. The outside temperature and the ambient temperature in this case are measured by temperature sensors (not shown) and are input to the nacelle control unit.

In step S2, it is determined whether the temperature measured by the temperature sensor for measuring the ambient temperature in the nacelle 3 is higher than a set point for the electrical control devices in the nacelle. If the result is YES, that is, the ambient temperature is higher than the set point, the process proceeds to step S3, where the blowing unit 20 is operated to send the air in the nacelle 3 under pressure as temperature-regulating air.

In the next step S4, the air that is thus sent under pressure is cooled by the heat pump as necessary. That is, in cases such as when the air temperature in the nacelle 3 is higher than a predetermined value, the air in the nacelle 3 that the internal fan 21 sucked in as temperature-regulating air is cooled by the operation of the heat pump. In cases such as when the temperature in the nacelle 3 is lower than the predetermined value or when no heat pump is provided, the air in the nacelle 3 may be sent under pressure to the rotor head 4 without being processed. In such a case, step S4 is unnecessary.

In the next step S5, the temperature-regulating air (cooled air) cooled by the heat pump as necessary is sent under pressure from the blowing unit 20 into the rotor head 4 through the rotary joint 30. As a result, in the next step S6, the interior of the rotor head 4 can be cooled by receiving low-temperature temperature-regulating air.

The above-described control can reduce or prevent an increase in the temperature of the interior of the rotor head 4 by supplying cold air. Therefore, in particular, at a high outside temperature, the temperature of the interior of the rotor head 4 can be controlled by cooling so as not to exceed the upper limit for operation set for the control devices etc. mounted in the rotor head 4. For the control in this case, it is assumed that the interior of the nacelle 3 and the interior of the rotor head 4 are at substantially the same temperature. However, when there is a difference in internal temperature between the nacelle 3 and the rotor head 4, it is desirable to measure not only the temperature in the nacelle 3 but also the temperature in the rotor head 4.

On the other hand, in step S11, when returning from a long period of halted operation at a low outside air temperature, that is, at an ambient temperature at which the temperature of the electrical control devices decreases and oils such as hydraulic working oil and lubricating oil become highly viscous, the process proceeds to the next step S12.

In step S12, if the temperature measured by the temperature sensor that measures the ambient temperature is lower than the set point for the electrical control devices in the nacelle or if it is lower than a set point for the oils such as hydraulic working oil, the process proceeds to the next step S13. In step S13, the internal fan 21 of the blowing unit 20 is operated to send the air in the nacelle 3 under pressure.

In the next step S14, the temperature-regulating air that is thus sent under pressure is heated by a heating device, such as a heat pump or a heater, mounted in the blowing unit 20 as required. That is, in the case where the heating device is a heat pump, the blowing unit 20 executes the operation of heating the temperature-regulating air that is sucked from the interior of the nacelle 3 and is sent under pressure with the internal fan 21 by circulating the refrigerant in the direction opposite to that in the cooling in the step S4 described above.

In the next step S5, the temperature-regulating air (warm air) heated by the heating device of the blowing unit 20 is sent under pressure into the rotor head 4 through the rotary joint 30. As a result, in the next step S6, high-temperature temperature-regulating air is supplied into the rotor head 4, thereby allowing heating of the interior of the rotor head 4.

Since the warm air is supplied into the rotor head 4 by the above-described control to increase the internal air temperature, temperature control can be performed by heating so that the temperature does not exceed the lower operating temperature limit set for the oils and the control devices installed in the rotor head 4, particularly as in the case of a low outside temperature.

Since such temperature control allows temperature management of the interior of the rotor head 4, a nearly sealed structure having a minimum gap for ventilation and cooling can be employed, thus solving the problem of rainwater intrusion through the gap. Furthermore, even if liquid, such as working oil or lubricating oil, in the hydraulic mechanism leaks into the rotor head 4, the leaked liquid is not splashed around the wind turbine generator 1 due to the rotation of the rotor head 4.

In this way, according to the present invention described above, the rotary joint 30 is interposed at an appropriate position on the driving shaft that joins the rotor head 4 and the nacelle 3, so that the air for regulating the temperature in the rotor head can be supplied from the interior of the non-rotating side nacelle 3 into the rotating-side rotor head 4 through the rotary joint 30. Therefore, the internal temperature of the rotor head 4 can be managed by cooling or heating the interior as necessary. This allows the control devices etc. mounted in the rotor head 4 to be operated within a predetermined temperature range and, furthermore, can prevent changes in the properties of hydraulic working oil, lubricating oil, etc. at a low temperature, thus improving the reliability and durability of the wind turbine generator 1.

Furthermore, since the installation location of the blowing unit 20 can be set in the nacelle 3, many advantages can be offered; for example, the environment is better than that in the rotary head 4 and, in addition, its installation location can easily be ensured. In particular, installing the compressor of a heat pump, a heating heater, or the like, which consume much power, in the nacelle 3 can reduce the volume of a slip ring.

Although the above-described embodiment is configured to supply temperature-regulating air into the rotor head 4 using the blowing unit 20, it is not limited thereto; another cooling source and heating source may be adopted. The fluid for use in temperature regulation is not limited to air, and another gas or liquid may be used.

The present invention is not limited the above-described embodiment; for example, the position of the driving system in which the rotary joint is interposed, the type and configuration of the rotary joint, and the kind and number of fluids etc. that pass through the rotary joint can be modified as appropriate without departing from the spirit thereof.

The invention claimed is:

1. A wind turbine generator, comprising:
a driving and generating mechanism accommodated in a nacelle, which is connected to a rotor head equipped with wind turbine blades;
devices disposed inside the rotor head and including
a blowing unit positioned inside the nacelle for regulating a temperature in the rotor head and regulating temperature of fluid in the nacelle; and,
a rotary joint interposed in a driving shaft system that joins the rotor head and the nacelle; and
a main shaft for transmitting rotation of the rotor head; wherein
the rotary joint includes a fixed-side main body fixed to and supported by a side of the nacelle and a rotating-side main body joined to a side of the rotor head, and
the fluid for regulating the temperature in the rotor head is supplied from the interior of the nacelle into the rotor head and flows in a first temperature regulation fluid supply pipe joined to the fixed-side main body to a second temperature regulation fluid supply pipe passing through the rotating-side main body, inside the rotary joint, and
the second temperature regulation fluid supply pipe passes through the main shaft.

2. The wind turbine generator according to claim 1, wherein the blowing unit comprises a fan.

3. The wind turbine generator according to claim 2, wherein the blowing unit is configured to blow the fluid in the nacelle by the fan to regulate the temperature in the rotor head.

* * * * *